(12) United States Patent
Yazaki

(10) Patent No.: US 10,050,676 B2
(45) Date of Patent: Aug. 14, 2018

(54) WIRELESS POWER FEEDING APPARATUS, COMMUNICATION METHOD, AND COMPUTER PROGRAM

(71) Applicant: PIONEER CORPORATION, Kanagawa (JP)

(72) Inventor: Satoshi Yazaki, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 283 days.

(21) Appl. No.: 14/782,482

(22) PCT Filed: Apr. 3, 2013

(86) PCT No.: PCT/JP2013/060199
§ 371 (c)(1),
(2) Date: Oct. 5, 2015

(87) PCT Pub. No.: WO2014/162535
PCT Pub. Date: Oct. 9, 2014

(65) Prior Publication Data
US 2016/0065269 A1    Mar. 3, 2016

(51) Int. Cl.
*H01F 27/42* (2006.01)
*H01F 37/00* (2006.01)
(Continued)

(52) U.S. Cl.
CPC ........ *H04B 5/0037* (2013.01); *B60L 11/1829* (2013.01); *B60L 11/1838* (2013.01);
(Continued)

(58) Field of Classification Search
CPC .................................. H04B 5/0037
(Continued)

(56) References Cited

U.S. PATENT DOCUMENTS

2010/0013322 A1   1/2010  Sogabe et al.
2014/0139038 A1*  5/2014  Konno ............. B60L 3/0069
                                                       307/104

FOREIGN PATENT DOCUMENTS

JP    2010-028935    2/2010
JP    2012-249405   12/2012
WO  WO 20121165243  12/2012

OTHER PUBLICATIONS

International Search Report, PCT/JP2013/060199, dated Jul. 2, 2013.

* cited by examiner

*Primary Examiner* — Lincoln Donovan
*Assistant Examiner* — Metasebia Retebo
(74) *Attorney, Agent, or Firm* — Young & Thompson

(57) ABSTRACT

A wireless power feeding apparatus (100) is configured to perform wireless communication with a power reception side apparatus (200) and to perform wireless power transmission to the power reception side apparatus. The wireless power feeding apparatus is provided with: a communicating device (120) configured to switch between a first communication method that allows one-to-many communication and a second communication method that has less communication delay than the first communication method, thereby performing the wireless communication; and a communication controlling device (110) configured to control the communicating device to switch from the first communication method to the second communication method and to perform the wireless communication in the second communication method, on condition that the wireless power feeding apparatus becomes in a state in which the power transmission can be performed, when the communicating device performs the wireless communication in the first communication method.

7 Claims, 2 Drawing Sheets

(51) Int. Cl.
    *H01F 38/00*     (2006.01)
    *H04B 5/00*     (2006.01)
    *H02J 50/60*     (2016.01)
    *H02J 50/90*     (2016.01)
    *H02J 17/00*     (2006.01)
    *H02J 7/02*     (2016.01)
    *B60L 11/18*     (2006.01)
    *H02J 5/00*     (2016.01)
    *H02J 50/10*     (2016.01)
    *H02J 50/80*     (2016.01)
    *H02J 7/00*     (2006.01)

(52) U.S. Cl.
    CPC .............. *H02J 5/005* (2013.01); *H02J 7/025* (2013.01); *H02J 17/00* (2013.01); *H02J 50/10* (2016.02); *H02J 50/60* (2016.02); *H02J 50/80* (2016.02); *H02J 50/90* (2016.02); *H04B 5/0075* (2013.01); H02J 2007/0096 (2013.01); Y02T 10/7005 (2013.01); Y02T 10/7072 (2013.01); Y02T 90/121 (2013.01); Y02T 90/122 (2013.01); Y02T 90/125 (2013.01); Y02T 90/128 (2013.01); Y02T 90/14 (2013.01); Y02T 90/16 (2013.01); Y02T 90/163 (2013.01)

(58) Field of Classification Search
    USPC ......................................................... 307/104
    See application file for complete search history.

WIRELESS POWER FEEDING APPARATUS, COMMUNICATION METHOD, AND COMPUTER PROGRAM

TECHNICAL FIELD

The present invention relates to a wireless power feeding apparatus, and particularly relates to a wireless power feeding apparatus configured to perform wireless communication with a power reception side apparatus, a communication method, and a computer program.

BACKGROUND ART

In this type of apparatus, before power feeding, a communication method that has a relatively long communicable distance and that allows one-to-many communication is desired. On the other hand, during power feeding, a communication method that has a relatively short communication delay time and that allows regular communication is desired.

For example, Patent Literature 1 describes an apparatus provided with: a first communicating device configured to perform remote wireless communication between a vehicle, which is the power reception side apparatus, and a power feeding apparatus; and a second communicating device configured to perform wireless communication between the vehicle and the power feeding apparatus. Here, in particular, it is described that the remote wireless communication by the first communicating device is ended and is switched to the wireless communication by the second communicating device if a distance between the vehicle and the power feeding apparatus is less than a predetermined distance.

CITATION LIST

Patent Literature

Patent Literature 1: Japanese Patent Application Laid Open No. 2012-249405

SUMMARY OF INVENTION

Technical Problem

However, the technology described in the Patent Literature 1 has such a technical problem that there is room for improvement.

In view of the aforementioned problem, it is therefore an object of the present invention to provide a wireless power feeding apparatus that can appropriately switch the method of communication with the power reception side apparatus and that can improve operation efficiency, a communication method, and a computer program.

Solution to Problem

The above object of the present invention can be achieved by a wireless power feeding apparatus configured to perform wireless communication with a power reception side apparatus and configured to perform wireless power transmission to the power reception side apparatus, said wireless power feeding apparatus is provided with: a communicating device configured to switch between a first communication method that allows one-to-many communication and a second communication method that has less communication delay than the first communication method, thereby performing the wireless communication; and a communication controlling device configured to control said communicating device to switch from the first communication method to the second communication method and to perform the wireless communication in the second communication method, on condition that said wireless power feeding apparatus becomes in a state in which the power transmission can be performed, when said communicating device performs the wireless communication in the first communication method.

The above object of the present invention can be achieved by a communication method on a wireless power feeding apparatus configured to perform wireless communication with a power reception side apparatus and configured to perform wireless power transmission to the power reception side apparatus, wherein said wireless power feeding apparatus is provided with: a communicating device configured to switch between a first communication method that allows one-to-many communication and a second communication method that has less communication delay than the first communication method, thereby performing the wireless communication, and said communication method is provided with a communication controlling process of controlling the communicating device to switch from the first communication method to the second communication method and to perform the wireless communication in the second communication method, on condition that said wireless power feeding apparatus becomes in a state in which the power transmission can be performed, when said communicating device performs the wireless communication in the first communication method.

The above object of the present invention can be achieved by a computer program for making a computer function as a communicating device and a communication controlling device, the computer being mounted on a wireless power feeding apparatus configured to perform wireless communication with a power reception side apparatus and configured to perform wireless power transmission to the power reception side apparatus, wherein the communicating device configured to switch between a first communication method that allows one-to-many communication and a second communication method that has less communication delay than the first communication method, thereby performing the wireless communication; and the communication controlling device configured to control said communicating device to switch from the first communication method to the second communication method and to perform the wireless communication in the second communication method, on condition that said wireless power feeding apparatus becomes in a state in which the power transmission can be performed, when said communicating device performs the wireless communication in the first communication method.

The operation and other advantages of the present invention will become more apparent from embodiments and an example explained below.

Figure 1:
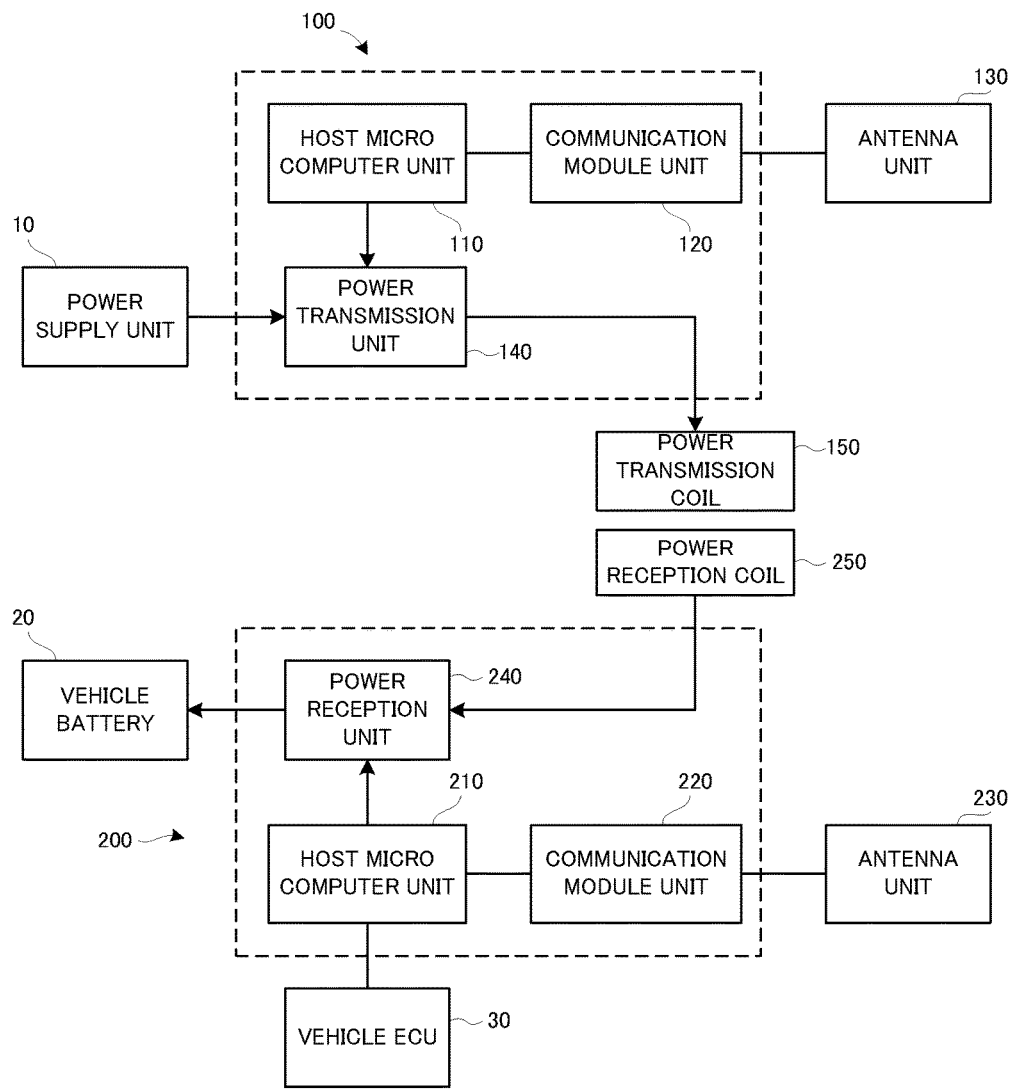
FIG. 1 is a block diagram illustrating a configuration of a wireless power feeding system according to an example.

DESCRIPTION OF EMBODIMENTS (Wireless Power Feeding Apparatus)

A wireless power feeding apparatus according to an embodiment of the present invention will be explained.

The wireless power feeding apparatus according to the embodiment is configured to perform wireless communication with a power reception side apparatus such as, for example, a hybrid vehicle and an electric vehicle, and is configured to perform wireless power transmission to the power reception side apparatus.

A communicating device, which is provided with, for example, a memory, a processor, and the like, is configured to switch between a first communication method that allows one-to-many communication and a second communication method that has less communication delay than the first communication method, thereby performing the wireless communication.

A communication controlling device, which is provided with, for example, a memory, a processor, and the like, is configured to control the communicating device to switch from the first communication method to the second communication method and to perform the wireless communication in the second communication method, on condition that the wireless power feeding apparatus becomes in a state in which the power transmission can be performed, when the communicating device performs the wireless communication in the first communication method. In other words, on the wireless power feeding apparatus according to the embodiment, the wireless communication is performed in the second communication method, at least in a period in which the power transmission is performed.

Thus, on the wireless power feeding apparatus according to the embodiment, during power transmission, the wireless communication can be performed between the wireless power feeding apparatus and the power reception side apparatus, in the second communication method that has relatively less communication delay. As a result, during power transmission, real-time communication and quick abnormality notification can be performed.

On the other hand, in a period in which the power transmission is not performed, the wireless communication is performed mainly in the first communication method. It is therefore possible to simultaneously communicate with a plurality of power reception side apparatuses that are in a communicable range of the wireless power feeding apparatus, and it is also possible to relatively quickly specify a power reception side that requires the power transmission performed by the wireless power feeding apparatus.

Here, in particular, the control the communicating device is controlled by the communication controlling device to switch from the first communication method to the second communication method and to perform the wireless communication in the second communication method, on condition that the wireless power feeding apparatus becomes in the state in which the power transmission can be performed.

If the communication method is switched from the first communication method to the second communication method before the wireless power feeding apparatus becomes in the state in which the power transmission can be performed, it is possibly hard to make response to a case where the power reception side apparatus goes out of the communicable range of the wireless power feeding apparatus after the switching of the communication method.

In the wireless power feeding apparatus according to the embodiment, however, the wireless communication is performed in the first communication method until the wireless power feeding apparatus becomes in the state in which the power transmission can be performed. It is thus possible to suppress that the power reception side apparatus goes out of the communicable range of the wireless power feeding apparatus. In addition, even in a period from when the power reception side apparatus that requires the power transmission is specified to when the wireless power feeding apparatus becomes in the state in which the power transmission can be performed, it is possible to specify a power reception side apparatus that requires the power transmission next.

In one aspect of the wireless power feeding apparatus according to the embodiment, wherein said communication controlling device transmits information indicating a change in the communication method, to the power reception side apparatus, before the first communication method and the second communication method are switched between.

According to this aspect, the respective communication methods of the wireless power feeding apparatus and the power reception side apparatus can be changed at the same time, which is extremely useful in practice.

In another aspect of the wireless power feeding apparatus according to the embodiment, wherein said communication controlling device determines whether or not the power transmission can be performed, by at least determining whether or not the power reception side apparatus specified, in the first communication method, as a target of the power transmission performed by said wireless power feeding apparatus is placed in a position that allows the power transmission to be performed.

According to this aspect, it is possible to relatively easily determine whether or not the power transmission can be performed, which is extremely useful in practice.

In another aspect of the wireless power feeding apparatus according to the embodiment, wherein said wireless power feeding apparatus obtains, in the second communication method, data indicating whether or not the power transmission is normally performed, via said communicating device, when the power transmission is performed.

According to this aspect, it is possible to relatively easily detect whether or not the power transmission is normally performed between the wireless power feeding apparatus and the power reception side apparatus, which is extremely useful in practice.

Alternatively, in another aspect of the wireless power feeding apparatus according to the embodiment, wherein the wireless power feeding apparatus is further provided with a determining device configured to obtain, in the second communication method, state data indicating a state of the power transmission side apparatus, via said communicating device, when the power transmission is performed, and configured to determine whether or not the power transmission is normally performed, on the basis of the obtained state data.

According to this aspect, it is possible to relatively easily detect whether or not the power transmission is normally performed between the wireless power feeding apparatus and the power reception side apparatus, which is extremely useful in practice. Here, the "state data" means physical quantity or parameters that vary with the power transmission, such as, for example, data indicating a voltage value and data indicating a current value.

(Communication Method)

A communication method according to an embodiment of the present invention will be explained.

The communication method according to the embodiment is a communication method on a wireless power feeding apparatus configured to perform wireless communication with a power reception side apparatus and configured to perform wireless power transmission to the power reception side apparatus.

Here, the wireless power feeding apparatus is provided with a communicating device configured to switch between a first communication method that allows one-to-many communication and a second communication method that has less communication delay than the first communication method, thereby performing the wireless communication.

The communication method is provided with a communication controlling process of controlling the communicating device to switch from the first communication method to the second communication method and to perform the wireless communication in the second communication method, on condition that the wireless power feeding apparatus becomes in a state in which the power transmission can be performed, when the communicating device performs the wireless communication in the first communication method.

According to the communication method in the embodiment, as in the wireless power feeding apparatus according to the embodiment described above, it is possible to suppress that the power reception side apparatus goes out of the communicable range of the wireless power feeding apparatus, due to the switching of the communication method.

(Computer Program)

A computer program according to an embodiment of the present invention will be explained.

The computer program according to the embodiment makes a computer function as a communicating device and a communication controlling device, the computer being mounted on a wireless power feeding apparatus configured to perform wireless communication with a power reception side apparatus and configured to perform wireless power transmission to the power reception side apparatus, wherein the communicating device configured to switch between a first communication method that allows one-to-many communication and a second communication method that has less communication delay than the first communication method, thereby performing the wireless communication, and the communication controlling device configured to control the communicating device to switch from the first communication method to the second communication method and to perform the wireless communication in the second communication method, on condition that the wireless power feeding apparatus becomes in a state in which the power transmission can be performed, when the communicating device performs the wireless communication in the first communication method.

According to the computer program in the embodiment, the wireless power feeding apparatus according to the embodiment described above can be relatively easily realized as the computer provided in the wireless power feeding apparatus reads and executes the computer program from a recording medium for storing the computer program, such as a random access memory (RAM), a compact disc read only memory (CD-ROM) and a DVD read only memory (DVD-ROM), or as it executes the computer program after downloading the program through a communication device. By this, as in the wireless power feeding apparatus according to the embodiment described above, it is possible to suppress that the power reception side apparatus goes out of the communicable range of the wireless power feeding apparatus, due to the switching of the communication method.

Example

A wireless power feeding apparatus according to an example of the present invention will be explained with reference to FIG. 1 and FIG. 2. FIG. 1 is a block diagram illustrating a configuration of a wireless power feeding system according to the example.

In FIG. 1, the wireless power feeding system is provided with a power feeding apparatus 100 and a power reception side apparatus 200. In the example, the power feeding apparatus 100 is placed in a charging facility such as a so-called charging spot, and the power reception side apparatus 200 is mounted on a vehicle such as, for example, a hybrid vehicle and an electric vehicle.

The power feeding apparatus 100 is provided with a host microcomputer unit 110, a communication module unit 120, an antenna unit 130, a power transmission unit 140, and a power transmission coil 150.

The host microcomputer unit 110 is configured to change communication setting. Specifically, the host microcomputer unit 110 performs, for example, stealth ON/OFF switching, changing of a beacon interval, or similar actions, regarding a MAC layer of a communication protocol. The host microcomputer unit 110 performs, for example, switching between a general-purpose protocol such as TCP/IP and an exclusive protocol such as WAVE, updating and stopping of an address resolution protocol (ARP), or similar actions, regarding a network layer of the communication protocol. The host microcomputer unit 110 performs, for example, changing of a communication interval, changing of a packet size (i.e. data amount), or similar actions, regarding an application layer of the communication protocol.

The communication module unit 120 is configured to perform wireless communication, in a first communication method that has a relatively long communicable distance and that allows one-to-many communication and in a second communication method that has a relatively short communication delay time and that allows regular communication. As the first communication method, for example, the "IEEE 802.11n" standard or the like is exemplified. On the other hand, as the second communication method, for example, the "IEEE 802.11p" standard, the "Zigbee" standard, the "Blutooth" standard, the "ad hoc" standard, the "WiFii Direct" standard, and the like are exemplified.

The power transmission unit 140 is electrically connected to an external power supply unit 10 such as, for example, an alternating current (AC) power supply, and receives an electric power supply from the power supply unit 10.

On the other hand, the power reception side apparatus 200 is provided with a host microcomputer unit 210, a communication module unit 220, an antenna unit 230, a power reception unit 240, and a power reception coil 250.

The host microcomputer unit 210 is configured to perform inter communication with a vehicle electronic control unit (ECU) 30 of the vehicle (not illustrated) on which the power reception side apparatus 200 is mounted. The host microcomputer unit 210 is also configured to change the communication setting, as in the host microcomputer unit 110 described above.

The communication module unit 220 is also configured to perform the wireless communication in the first communication method and the second communication method, as in the communication module unit 120 described above. The power reception side apparatus 20 may be also provided with a communication module unit that can perform the wireless communication in the first communication method, and a communication module unit that can perform the wireless communication in the second communication method, instead of the communication module unit 220.

The power reception unit 240 is electrically connected to a vehicle battery 20 of the vehicle on which the power reception side apparatus 200 is mounted. The power reception unit 240 is configured to charge the vehicle battery 20 with electric power received via the power reception coil 250.

The host microcomputer units 110 and 210 are in charge of communication associated with the application layer and the network layer. The communication module units 120 and 220 are in charge of communication associated with the MAC layer and a physical layer.

Various known aspects can be applied to the power transmission unit 140, the power transmission coil 150, the power reception unit 240, and the power reception coil 250. An explanation of the details will be thus omitted in order to avoid a complicated explanation.

By the way, a condition required for the wireless communication performed between the power feeding apparatus 100 and the power reception side apparatus 200 during power feeding (i.e. when power transmission is performed between the power transmission coil 150 and the power reception coil 250) and a condition required for the wireless communication performed between the power feeding apparatus 100 and the power reception side apparatus 200 during non-feeding of power are different from each other.

Specifically, during power feeding, in order to perform real-time communication and quick abnormality notification, it is required that data associated with the power feeding is communicated without any loss at equal intervals. It is thus required that the communication method during power feeding has relatively less communication delay and can correspond to regular communication.

On the other hand, during non-feeding of power, in order to specify a charging target vehicle from among vehicles that are in a predetermined range (e.g. within 100 m in radius) from the power feeding apparatus 100, relatively long-distance communication and one-to-many communication are required. It is thus required that the communication method during non-feeding of power has a relatively long communicable distance and can perform one-to-many communication.

The communication module unit 120 of the power feeding apparatus 100 according to the example is configured to perform the wireless communication in the first communication method and the second communication method, as described above. Then, during power feeding, the communication module unit 120 is controlled by the host microcomputer unit 110 to perform the wireless communication in the second communication method.

A vehicle searching/charging process performed on the power feeding apparatus 100 as configured above will be explained with reference to a flowchart in FIG. 2.

Figure 2:
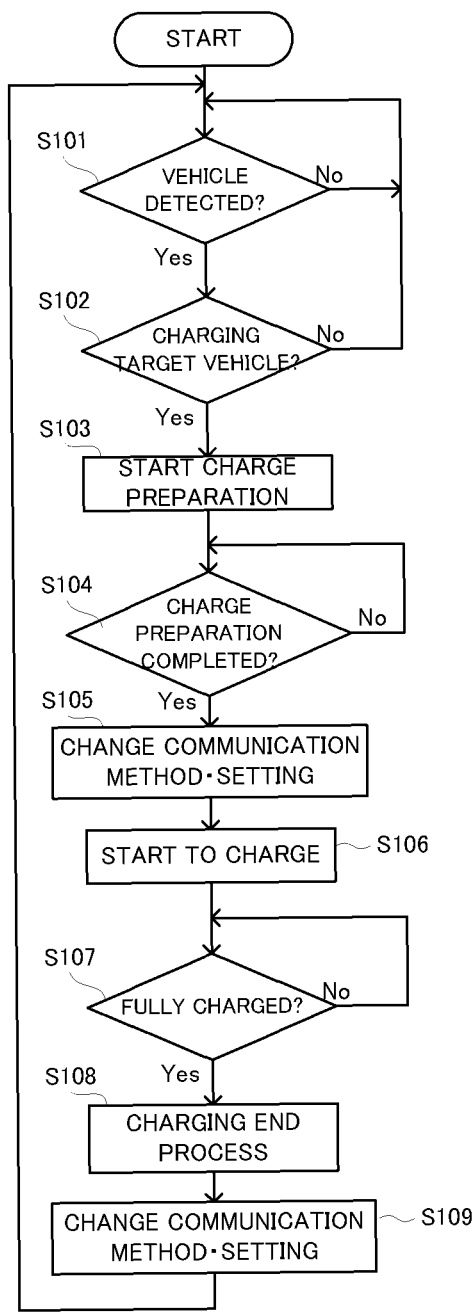
FIG. 2 is a flowchart illustrating a vehicle searching / charging process according to the example.

In FIG. 2, firstly, the host microcomputer unit 110 of the power feeding apparatus 100 determines whether or not there is a vehicle in a predetermined range from the power feeding apparatus 100, on the basis of a signal received via the antennal unit 130, while controlling the communication module unit 120 to perform the wireless communication in the first communication method (step S101).

If there is no vehicle (i.e. the vehicle is not detected) (the step S101; No), the host microcomputer unit 110 performs the process in the step S101. If there is the vehicle (i.e. the vehicle is detected) (the step S101; Yes), the host microcomputer unit 110 determines whether or not the vehicle is a charging target vehicle (step S102). Whether or not the vehicle is the charging target vehicle may be determined, for example, by confirming an ID associated with the power reception side apparatus 200 mounted on the vehicle or by performing similar actions.

If it is determined that the vehicle is not the charging target vehicle (the step S102: No), the host microcomputer unit 110 performs the process in the step S101. On the other hand, if tis determined that the vehicle is the charging target vehicle (the step S102: Yes), the host microcomputer unit 110 starts predetermined charge preparation (step S103).

The charge preparation includes, for example, warm-up of the power feeding apparatus 100, abnormality confirmation of the power feeding apparatus 100, abnormality detection in the surroundings of the power feeding apparatus 100 (or the power transmission coil 150), or the like. If the charge preparation is started at a time point of the detection of the charging target vehicle, power feeding can be relatively quickly started, when the charging target vehicle arrives in a so-called charging spot in which the power feeding apparatus 100 is placed, and it is extremely useful in practice.

The host microcomputer unit 110 then determines whether or not the charge preparation is completed (step S104). Here, the "completion of the charge preparation" means that the following conditions are satisfied; for example, that a power mechanism of the vehicle, such as an engine, is stopped, that the vehicle is parked in a predetermined position (i.e. a positional relation between the power transmission coil 150 and the power reception coil 250 is normal), that the power feeding apparatus 100 normally operates, that there is no foreign body in the surroundings of the power transmission coil 150, or similar conditions. In other words, the "completion of the charge preparation" means a state in which the power feeding (or charging of the vehicle battery 20 herein) can be immediately started.

If it is determined that the charge preparation is not completed (the step S104: No), the host microcomputer unit 110 performs the process in the step S104. On the other hand, if it is determined that the charge preparation is completed (the step S104: Yes), the host microcomputer unit 110 controls the communication module unit 120 to transmit a signal indicating a communication method change, in the first communication method, to the host microcomputer unit 210 of the power reception side apparatus 100 mounted on the charging target vehicle.

The host microcomputer unit 110 then controls the communication module unit 120 to change the communication method from the first communication method to the second communication method, and changes the communication setting (step S105). At the same time of the communication method change and the communication setting change on the power feeding apparatus 100, the host microcomputer unit 210 of the power reception side apparatus 200 controls the communication module unit 220 to change the communication method from the first communication method to the second communication method, and changes the communication setting.

Due to the communication method change after the completion of the charge preparation as described above, for example, the following effect can be obtained.

(i) Repeated implementation of the process associated with the charge preparation can be avoided. This is because, for example, a vehicle position recognition process, a foreign body detection process, or the like is possibly repeated if the communication method is changed before the completion of the charge preparation.

(ii) Response can be made to a case where the charging target vehicle that is sufficiently close to the power feeding apparatus 100 goes away from the power feeding apparatus 100 before the completion of the charge preparation. This is because a communicable range associated with the second communication method is relatively narrow, and thus, if the charging target vehicle goes away from the power feeding apparatus 100 after the completion of the charge preparation, the charging target vehicle is out of the communicable range and the communication with the charging target vehicle is lost.

After the process in the step S105, the host microcomputer unit 110 controls the power transmission unit 140 to start a predetermined charging process (step S106). The host microcomputer unit 110 then determines whether or not it is fully charged, with reference to a signal transmitted from the power reception side apparatus 200 or the like (step S107).

If it is determined that it is not fully charged (the step S107: No), the host microcomputer unit 110 performs the process in the step S107. On the other hand, if it is determined that it is fully charged (the step S107: Yes), the host microcomputer unit 110 performs a predetermined changing end process (step S108).

The host microcomputer unit 110 then controls the communication module unit 120 to transmit the signal indicating the communication method change, in the second communication method, to the host microcomputer unit 210 of the power reception side apparatus 200. The host microcomputer unit 110 then controls the communication module unit 120 to change the communication method from the second communication method to the first communication method, and changes the communication setting (step S109). At the same time of the communication method change and the communication setting change on the power feeding apparatus 100, the host microcomputer unit 210 of the power reception side apparatus 200 controls the communication module unit 220 to change the communication method from the second communication method to the first communication method, and changes the communication setting.

During charging, a signal such as, for example, signals indicating a voltage value and a current value associated with the vehicle battery 20 and a signal indicating whether or not the power transmission is normal, is exchanged between the power feeding apparatus 100 and the power reception side apparatus 200 in the second communication method. Specifically, for example, the host microcomputer unit 210 of the power reception side apparatus 200 determines whether or not the power transmission is normally performed, on the basis of the voltage value and the current value associated with the vehicle battery 20, and transmits a signal indicating a result of the determination to the power feeding apparatus 100. Alternatively, the host microcomputer unit 110 of the power feeding apparatus 100 determines whether or not the power transmission is normally performed, on the basis of the signals indicating the voltage value and the current value associated with the vehicle battery 20, which are obtained via the antenna unit 130, and transmits a signal indicating a result of the determination to the power reception side apparatus 200.

If some abnormality is detected on the basis of the signal exchanged in the second communication method, for example, a process of power stop, relay circuit cut-off, breaker cut-off, or the like in order to protect its system, for example, abnormality notification to a user by using a monitor, a LED, or the like provided for the power feeding apparatus 100, for example, abnormal status recording for maintenance, or similar actions are performed on the power feeding apparatus 100. On the other hand, on the power reception side apparatus 200, for example, relay circuit cut-off in order to protect the vehicle battery 20, abnormality notification to the vehicle ECU 30 in order to protect a vehicle system, or similar actions are performed.

The real-time communication using the second communication method makes it possible to detect the abnormality relatively quickly, thereby appropriately protecting the power feeding apparatus 100 and the power reception side apparatus 200 (or further, vehicle).

The "host microcomputer unit 110" according to the example is one example of the "communication controlling device" and the "determining device" according to the present invention. The "communication module unit 120" according to the example is one example of the "communicating device" according to the present invention.

Now, the effect of the power feeding apparatus 100 according to the example will be explained in comparison with a technology in which the communication method is switched depending on the distance between the power feeding apparatus and the vehicle, like the technology described in the Patent Literature 1 described above.

(a) The switching of the communication method requires a period of about over ten seconds to one minute, for example, due to establishment of a communication channel, authentication, or the like. Thus, if the communication is switched depending on the distance between the power feeding apparatus and the vehicle, the charging target vehicle arrives in a parking space (on the power transmission coil) associated with the power feeding apparatus, during switching of the communication method depending on a speed of the charging target vehicle.

As a result, there is a possibility that the charge preparation is not appropriately started. Specifically, for example, there is a possibility that support associated with coil positioning upon parking, which is provided by the power feeding apparatus, or the like cannot be used.

In the example, however, the communication method cannot be switched until the completion of the charge preparation. Thus, as described above, the charge preparation can be made until the charging target vehicle arrives in the parking space associated with the power feeding apparatus 100, and it is extremely useful in practice.

It is also conceivable that the two communication methods are simultaneously used until the completion of the switching of the communication method; however, this has problems of, for example, electric wave interference, power consumption increase, or the like.

(b) For example, it is assumed that the charging target vehicle comes close to the power feeding apparatus and the communication method is switched to a communication method suitable for a short distance (corresponding to the "second communication method" according to the example) and the charging target vehicle then goes out off the communicable range of the power feeding apparatus, for example, due to a sudden change in the user's schedule or the like. In this case, the power feeding apparatus loses sight of the charging target vehicle. Alternatively, the switching of the communication method is initiatively performed by the power feeding apparatus side, and there is thus a possibility that the communication method of the charging target vehicle is maintained to the communication method suitable for the short distance, and that a state of a ground facility such as a so-called charging spot (e.g. a state of full or empty, etc.) cannot be confirmed from the charging target vehicle.

(c) For example, it is assumed that the charging target vehicle goes away from the power feeding apparatus after the charging and the communication method is switched to a communication method suitable for a long distance (corresponding to the "first communication method" according to the example) and the charging target vehicle then comes close to the power feeding apparatus again, for example, due to a sudden change in the user's schedule, recharging, or the like. In this case, as described above, the switching of the communication method requires a time, and there is thus a possibility that the charging cannot be started immediately after the charging target vehicle parks in the parking space associated with the power feeding apparatus.

(d) For example, it is assumed that the charging target vehicle significantly moves upon parking position adjustment and goes out of the communicable range of the power feeding apparatus. There is a possibility that both states (e.g. coil relative position, abnormality information, etc.) cannot be confirmed.

(e) For example, it is assumed that in a range in which the power feeding apparatus performs communication in the communication method suitable for the short distance, there is a vehicle having a communication function corresponding to the communication method suitable for the short distance. Because the power feeding apparatus tries to communication with the vehicle, there is a possibility that another vehicle that desires charging cannot communicate with the power feeding apparatus.

In the example, however, as described above, the communication method is not switched until the completion of the charge preparation. Thus, the aforementioned (b) to (e) does not occur.

The present invention is not limited to the aforementioned embodiment and example, but various changes may be made, if desired, without departing from the essence or spirit of the invention which can be read from the claims and the entire specification. A wireless power feeding apparatus, a communication method, and a computer program which involve such changes are also intended to be within the technical scope of the present invention.

DESCRIPTION OF REFERENCE NUMERALS AND LETTERS 10 power supply unit
20 vehicle battery
30 vehicle ECU
100 power feeding apparatus
110, 210 host micro computer unit
120, 220 communication module unit
130, 230 antenna unit
140 power transmission unit
150 power reception coil
200 power reception side apparatus
240 power reception unit
250 power reception coil

The invention claimed is:

1. A wireless power feeding apparatus configured to perform wireless communication with a power reception side apparatus and configured to perform wireless power transmission to the power reception side apparatus, said wireless power feeding apparatus comprising:
a communicating device configured to switch between a first communication method that allows one-to-many communication and a second communication method that has less communication delay than the first communication method, thereby performing the wireless communication;
a state controlling device configured to put said wireless power feeding apparatus into a state in which said wireless power feeding apparatus can instantly start the wireless power transmission to the power reception side apparatus according to information received by said communicating device in the first communication method; and
a communication controlling device configured to control said communicating device to switch from the first communication method to the second communication method and to perform the wireless communication in the second communication method, on condition that said wireless power feeding apparatus becomes in the state in which said wireless power feeding apparatus can instantly start the wireless power transmission to the power reception side apparatus.

2. The wireless power feeding apparatus according to claim 1, wherein said communication controlling device transmits information indicating a change in the communication method, to the power reception side apparatus, before the first communication method and the second communication method are switched between.

3. The wireless power feeding apparatus according to claim 1, wherein said state controlling device determines whether or not said wireless power feeding apparatus is put into the state in which said wireless power feeding apparatus can instantly start the wireless power transmission to the power reception side apparatus, by at least determining whether or not the power reception side apparatus specified, in the first communication method, as a target of the power transmission performed by said wireless power feeding apparatus is placed in a position that allows the power transmission to be performed.

4. The wireless power feeding apparatus according to claim 1, wherein said wireless power feeding apparatus obtains, in the second communication method, data indicating whether or not the power transmission is normally performed, via said communicating device, when the power transmission is performed.

5. The wireless power feeding apparatus according to claim 1, further comprising a determining device configured to obtain, in the second communication method, state data indicating a state of the power transmission side apparatus, via said communicating device, when the power transmission is performed, and configured to determine whether or not the power transmission is normally performed, on the basis of the obtained state data.

6. A communication method on a wireless power feeding apparatus configured to perform wireless communication with a power reception side apparatus and configured to perform wireless power transmission to the power reception side apparatus, wherein
said wireless power feeding apparatus comprises: a communicating device configured to switch between a first communication method that allows one-to-many communication and a second communication method that has less communication delay than the first communication method, thereby performing the wireless communication, and
said communication method comprises:
a state controlling process of putting said wireless power feeding apparatus into a state in which said wireless power feeding apparatus can instantly start the wireless power transmission to the power reception side apparatus according to information received by said communicating device in the first communication method; and
a communication controlling process of controlling the communicating device to switch from the first communication method to the second communication method and to perform the wireless communication in the second communication method, on condition that said wireless power feeding apparatus becomes in the state in which said wireless power feeding apparatus can instantly start the wireless power transmission to the power reception side apparatus.

7. A non-transitory computer readable medium containing a computer program for making a computer function as a communicating device, a state controlling device and a communication controlling device, the computer being mounted on a wireless power feeding apparatus configured to perform wireless communication with a power reception side apparatus and configured to perform wireless power transmission to the power reception side apparatus, wherein the communicating device configured to switch between a first communication method that allows one-to-many communication and a second communication method that has less communication delay than the first communication method, thereby performing the wireless communication, the state controlling device configured to put said wireless power feeding apparatus into a state in which said wireless power feeding apparatus can instantly start the wireless power transmission to the power reception side apparatus according to information received by said communicating device in the first communication method, and the communication controlling device configured to control said communicating device to switch from the first communication method to the second communication method and to perform the wireless communication in the second communication method, on condition that said wireless power feeding apparatus becomes in the state in which said wireless power feeding apparatus can instantly start the wireless power transmission to the power reception side apparatus.

* * * * *